United States Patent [19]
Pauletich

[11] 4,015,684
[45] Apr. 5, 1977

[54] SNOW FIELD SOUND IMPLODER

[76] Inventor: Joseph Pauletich, 91-18 43rd Ave., Elmhurst, N.Y. 11373

[22] Filed: May 5, 1975

[21] Appl. No.: 574,240

[52] U.S. Cl. .............................. 181/120; 181/401; 181/119; 219/201; 219/271; 219/316
[51] Int. Cl.[2] ........................................ G01V 1/04
[58] Field of Search .......... 181/110, 113, 119, 120, 181/401, 402; 122/234, 508, 509; 219/201, 209, 271, 314, 316, 341, 473

[56] References Cited
UNITED STATES PATENTS
3,859,954 10/1972 Pauletich ........................... 181/113

FOREIGN PATENTS OR APPLICATIONS
826,932 1/1960 United Kingdom ............... 181/120

Primary Examiner—Howard A. Birmiel

[57] ABSTRACT

A sound imploder having as its exclusive function the creation of sonic phenomena when embedded in snow or ice fields. Special components are provided for production of steam as the source of the sound and heat for causing the device to immerse itself due to its own weight below the surface of the snow. A secondary sound source, in addition to the primary source, is also provided for mineral and other explorations underneath the body of snow.

5 Claims, 6 Drawing Figures

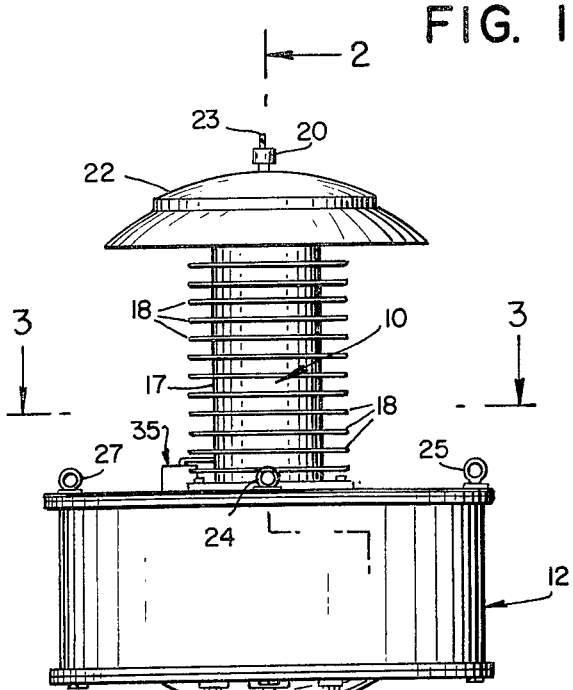
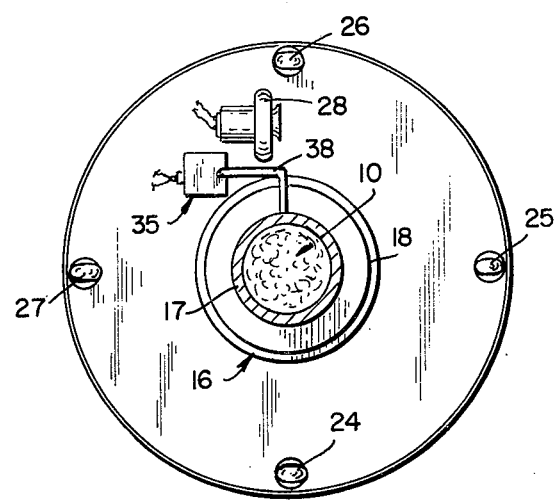
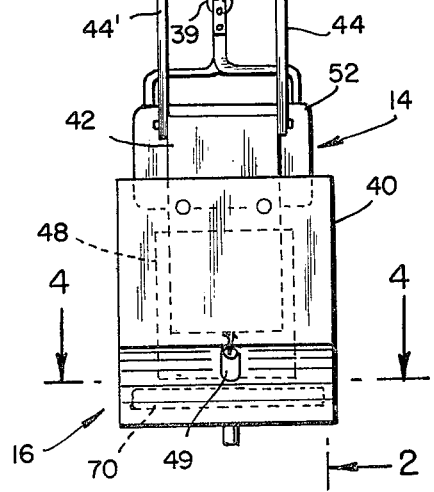
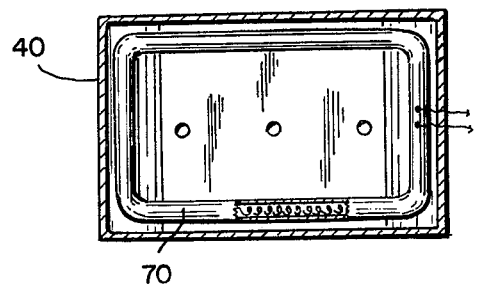
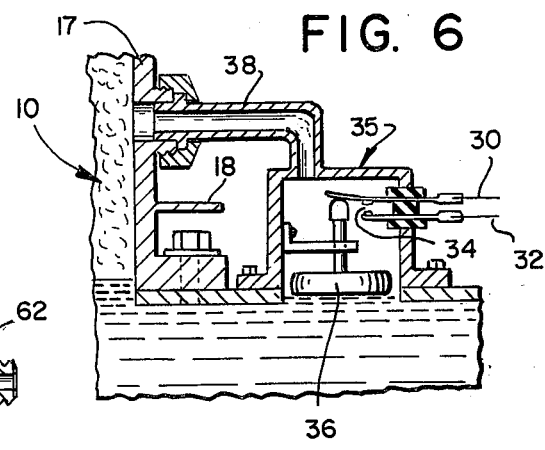
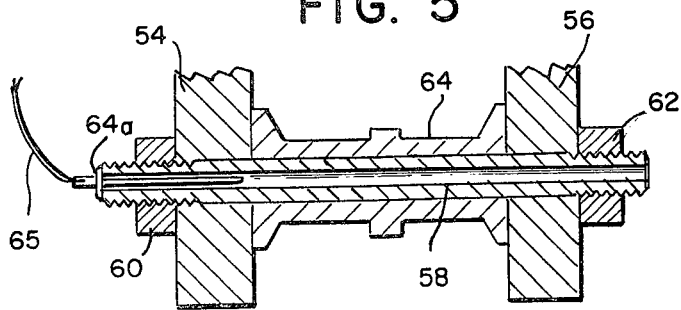

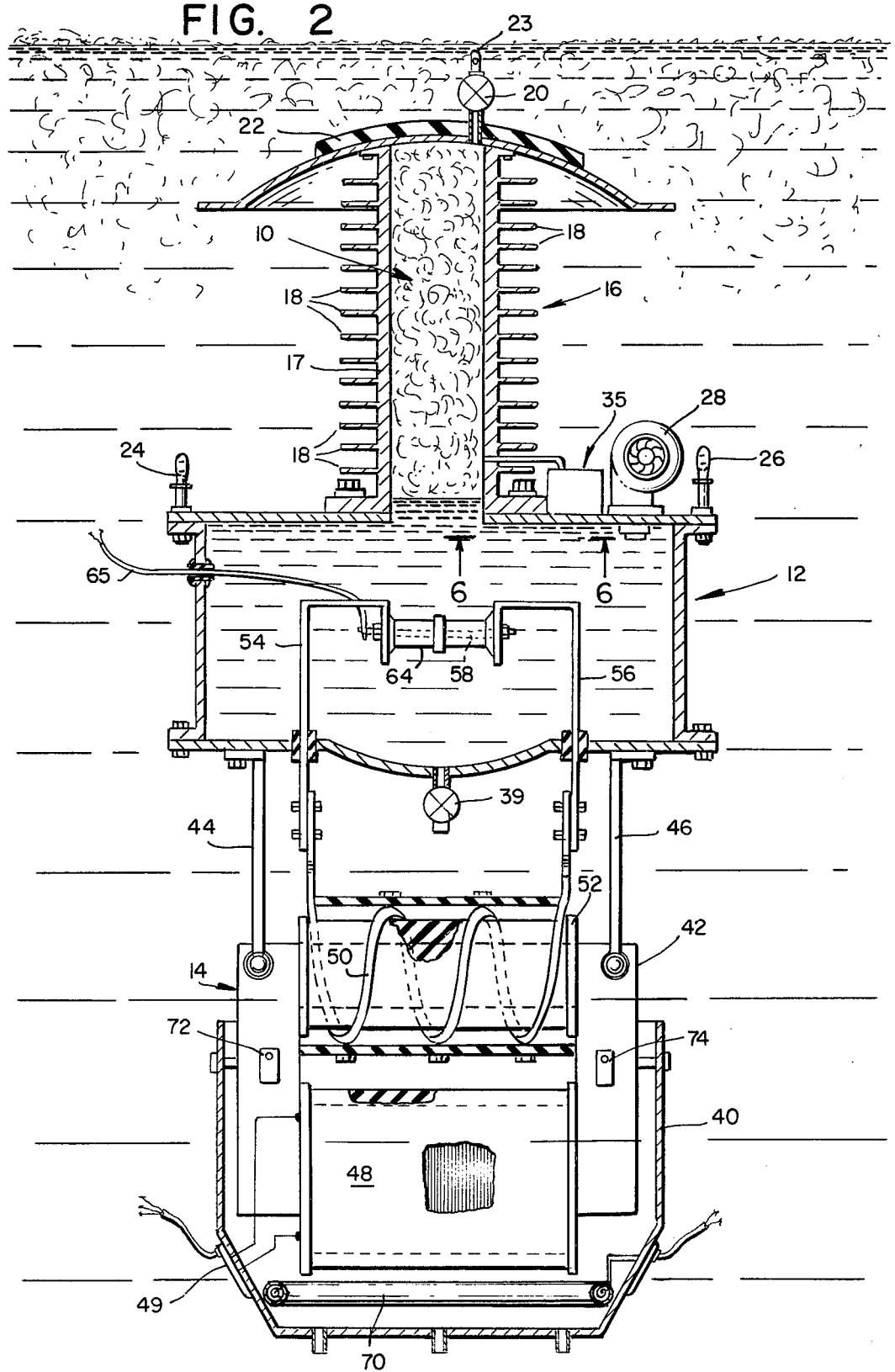

SNOW FIELD SOUND IMPLODER

The invention relates to sonic devices and, in particular, to such devices that produce sound by implosion techniques.

According to the invention there is provided a device having the capability of generating steam which is admitted to a top implosion chamber and which on cooling causes sudden condensation which in turn produces the desired sound impulses. The required heat generation is produced by a transformer which is exposed to the ambient conditions in which the device is expected to operate, namely, the snow or ice in which the device has embedded itself. The transformer is, therefore, continuously cooled during its operation. A special component powered by the same source as the transformer serves to melt the snow at the bottom of the imploder whereby its support is gradually removed allowing it to sink below the ice surface. A buzzer serving as a secondary source of sound is actuated by the fluctuating magnetic flux produced by the transformer being located in close proximity thereto.

One object of the invention is to provide an improved sound imploder especially adapted to operate under the surface of a snow field or the like.

Another object of the invention is to provide a steam operated sound imploder having the capability of burying itself in a field of ice or snow as a consequence of its own operation.

Other objects and advantages of the invention may be appreciated on reading the following description of one embodiment thereof which is taken in conjunction with the accompanying drawings, in which:

FIG. 1 is an elevation view of the sound imploder;

FIG. 2 is a section taken on line 2—2 of FIG. 1;

FIG. 3 is a section taken on line 3—3 of FIG. 1;

FIG. 4 is a section showing the heater ring taken on line 4—4 of FIG. 1;

FIG. 5 is a section showing the electrode components used to heat the tank water; and FIG. 6 is an enlarged detail of float water guage used to maintain automatically the water level in the tank.

Referring to the drawings, the imploder device principally comprises imploder chamber 10, tank 12, transformer section 14 and a bottom snow melter device 16.

The chamber 10 consists mainly of a cylindrical housing 17 about which are externally mounted heat radiating fins 18, the housing being in communication with the tank as shown in FIG. 2. A steam purge valve 20 is provided in the cover 22 for the chamber 10. A sound whistle 23 atop the valve 20 is also provided in order to generate an intermittent signal which may be used for synchronizing the receivers and their tapes which receive and record the primary and secondary sound impulses as subsequently explained.

On the top of the tank there are mounted cable supports 24, 25, 26, 27 and pump 28. The water level in the tank is automatically maintained due to the fact that the electric leads 30 and 32 connected to the pump on one side thereof are made and broken through contact switch 34 in float valve 35 being so actuated for that purpose by float 36 supported on the water surface of the tank. The top of the valve is exhausted to the chamber 10 by means of pipe conduit 38 which interconnects the two members. Drain valve 39 is provided in the bottom of the tank.

The transformer 14 is received in top, open ended receptacle 40, the conventional core 42 of the transformer being suspended therein by supporting straps 44, 44', 46 and 46' connected to the bottom of the tank 12. Primary winding 48 of the transformer supplied from cable box 49 is wound on the bottom leg of the core 42 and a secondary helical winding 50 is wound on the top leg of the core 42 which provides a continuous path for the flux. The winding 50 is held in position by sleeve 52 mounted about the core in spaced relation thereto being maintained in axial position by bolts through the sleeve and by extensions 54 and 56 of the winding itself which are connected to electrode 58 which is immersed in the liquid medium contained in the tank 12.

As shown in FIG. 5. the electrode 58 is a hollow conductive member the ends of which are externally threaded to receive nuts 60 and 62 for holding the electrode in place relative to the electric leads 54 and 56. A heat radiating sleeve 64 also electrically connected to the leads 54 and 56 is mounted about the electrode in head transfer contact therewith contains a pyrometer 64a supplied by outside cable 65 which serves to monitor the temperature of the heat generating electrode and its contacting sleeve.

Below the transformer and just above the bottom of the transformer cover or receptacle 40 is disposed a heater ring 70 which is electrically supplied from the cable box 49, the ring 70 being continuously disposed about the interior of the receptacle to radiate heat in all directions therethrough causing the snow and ice to melt and convert to water all about the device. The imploder chamber also serves this purpose on the top of the device whereby a sufficient quantity of water is always available during operation for supplying the tank although it should be understood that only a minimal amount of water is lost in operation, the generated steam in the imploder chamber condensing for the most part with the condensate returning to the tank after each implosion.

Buzzers 72 and 74 are mounted on the sides of the core 42 being caused to sound and generate additional noise serving as a secondary source of sound. The buzzers have vibratory reeds (not shown) which are caused to vibrate due to the presence of the changing magnetic flux field provided by the transformer.

In operation the imploder is lowered onto the surface of the ice and is turned on. The heater ring will start to melt the ice allowing the device to immerse itself into the body of the snow or ice field wherein it is embedded to emit sound impulses through the immersed medium for analysis of the return sonic frequencies that enable persons skilled in the art to evaluate the possibility of mineral formations in its vicinity.

Various modifications of the invention may be effected by persons skilled in the art without departing from the scope and principle thereof as defined in the appended claims.

What is claimed is:

1. A sonic imploder comprising a top steam chamber, a tank in communication with said chamber, a pump for maintaining the water level in said tank, a transformer, an electrode in said tank electrically heated by said transformer and a heater ring at the bottom of said imploder for melting snow and ice in which said device is adapted for sonic emission.

2. An imploder as defined in claim 1 wherein said transformer and ring are contained in an open ended exposed cover or receptacle whereby the components are cooled by the medium in which said imploder is situated.

3. An imploder as defined in claim 2 wherein a secondary sound source is disposed magnetically proximate to said transformer comprising a buzzer member having a vibratory reed.

4. An imploder as defined in claim 3 wherein a float member is provided responsive to the water level in said tank for controlling said pump and maintaining the desired water level in the tank.

5. An imploder as defined in claim 4 wherein a steam purge valve is in communication with said chamber and a whistle component is connected to said valve for generating intermittent sound to synchronize the receivers of the primary and secondary sonic impulses produced by said imploder.

* * * * *